Oct. 18, 1932. E. A. CLARK 1,883,571
COMPENSATING GAS REGULATOR ATTACHMENT
Filed Nov. 23, 1927
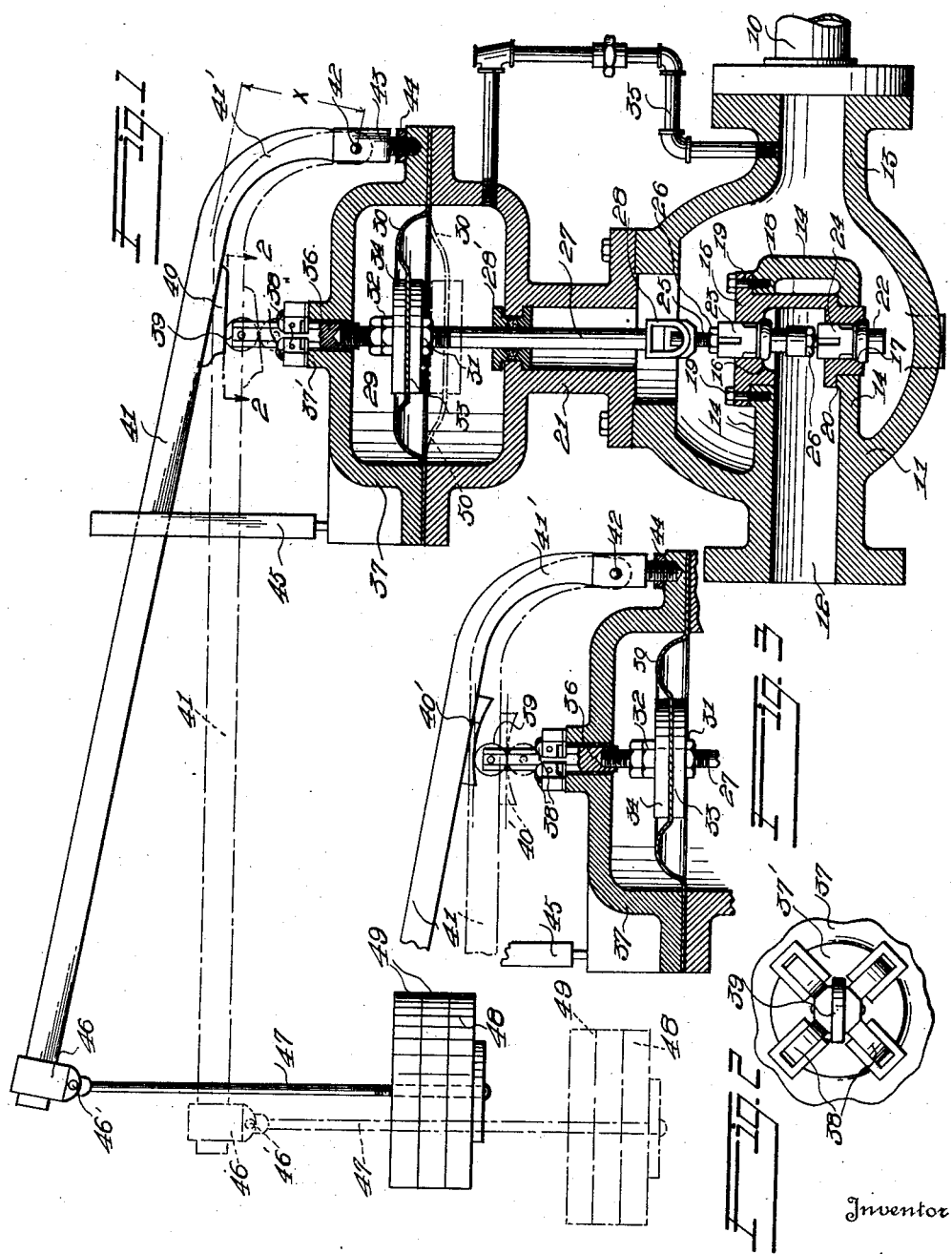
Inventor
Earle A. Clark
By William A. Strauch
Attorney Patented Oct. 18, 1932

1,883,571

UNITED STATES PATENT OFFICE

EARLE A. CLARK, OF TULSA, OKLAHOMA, ASSIGNOR TO PITTSBURGH EQUITABLE METER COMPANY, OF PITTSBURGH, PENNSYLVANIA

COMPENSATING GAS REGULATOR ATTACHMENT

Application filed November 23, 1927. Serial No. 235,347.

The present invention relates to compensating attachments for pressure regulators particularly adapted for use in gas distributing systems. Valves commonly employed as gas regulators are usually connected by a stem to an operating diaphragm in an operating gas chamber. The operating chamber is usually connected to an outlet gas conduit in which the pressure is to be regulated by a breathing pipe connection so that the diaphragm is subjected to the gas pressure to be regulated. A weight or spring is usually employed on the opposite side of the diaphragm to balance the gas pressure.

When the diaphragm is in its lowest position and the valves are wide open, this effective area subject to gas pressure includes not only the diaphragm support or pan but also the flexible annular portion of the diaphragm which extends beyond the central pan to the casing of the diaphragm chamber where the diaphragm is supported. This is due to the fact that the pressure of the gas on the flexible annular portion exerts an upward pull on the diaphragm pan or support and aids the pressure on the pan in pulling the valve stem upward. When the diaphragm is in its upper position and the valves are closed, the effective area subject to gas pressure which is transmitted to the valve stem is substantially less than when the diaphragm is in its lower position. This is due to the fact that the diaphragm assumes a position substantially as shown in full lines on the drawing, and part of the upward pressure is absorbed by the outer casing where the diaphragm is secured. This pull on the diaphragm support has no effect as regards lifting the diaphragm, and therefore the effective area of the diaphragm is less in its upper position than in its lower position.

Accordingly, as pressure exerted by the spring or weight is constant and the pressure tending to move the diaphragm and valve stem in its lower and upper positions is variable, the gas pressure is proportionately less with greater flow of gas than with the smaller flow, causing substantial and undesirable variations in the outlet pressures of the commonly used regulators.

It is accordingly an object of the present invention to provide an attachment to vary the regulating weight or pressure on the diaphragm as the diaphragm moves inward and outward to compensate for change in effective or valve operating diaphragm area, and to minimize the pressure variations as the flow of gas through the regulator is varied.

Still further objects of the invention will appear as the description proceeds with reference to the accompanying drawing, in which Figure 1 is a longitudinal sectional view of the preferred form of regulator.

Figure 2 is a view taken on line 2—2 of Figure 1 looking in the direction of the arrows.

Figure 3 is a longitudinal sectional view depicting certain modifications of the structure disclosed in Figure 1.

Referring to the drawing, 10 indicates a conduit through which a flow of gas at substantially uniform pressure is desired and in which valve casing 11 is connected. Casing 11 includes an inlet 12, an outlet 13, and walls 14 separating the inlet from the outlet. A valve cage 15 embodying spaced valve seats 16 and 17 connected together by a web 18 is bolted to one of the walls 14 by bolts 19. It will be observed that the portion of the cage having seat 17 is reduced in diameter providing a seat 20 for the cage. Cage 15 may readily be removed when the diaphragm head 21 is removed from casing 11 and bolts 19 are removed.

A valve 22 having sections 23 and 24 arranged to engage seats 16 and 17 of cage 15 controls the flow of fluid from valve inlet 12 through conduit 10. Section 24 has a threaded stem 25 projecting through a threaded socket in section 23 to permit adjustment of the valve sections accurately to their seats. Lock nuts 26 hold the valve sections in properly adjusted relation.

A valve operating rod or diaphragm stem 27 having a head 28 provided with a threaded bore is connected to the stem 25 and extends through a packing gland 28' into a chamber 29 formed in head 21. A flexible diaphragm 30 divides chamber 29 into two parts. Stem 27 has its upper end threaded. Upon this end nuts 31 and 32 are adjustably threaded clamping the mid-portion of the diaphragm and its supporting disks 33 and 34 between them. The lower diaphragm chamber is connected by a breathing pipe 35 to the outlet 13 of casing 11 whereby it is subjected to the outlet gas pressures.

The upper end of the diaphragm stem 27, is threaded into a socket of a guiding member 36 slidably supported in a bushing supported in extension 37′ of the diaphragm chamber cap 37. Cap 37 is provided with a supporting and securing flange by means of which it is secured to head 21 by suitable bolts or studs (not shown) and clamps the outer edge of flexible diaphragm 30 securely in position.

Supported on the extension 37′ are a plurality (preferably four) anti-friction guiding rollers 38. The upper section of guiding member 36 is octagonal in cross-section to provide plane roller engaging or guide surfaces, and the outer end of member 36 is bifurcated to support an anti-friction roller 39 journaled on a suitable supporting spindle. Roller 39 is engaged by a contact member 40 having a plane roller engaging surface and carried by a lever arm 41. Lever arm 41 is provided with a curved end portion 41′ adjacent the contact member 40, which curved portion at the lower end thereof is pivoted for movement about the pin 42 supported on the fulcrum post 43 threaded into a socket in the upper diaphragm casing section or cap member 37, and is held in position by lock nut 44.

Secured to the cap member 37 diametrically opposite the fulcrum post 43 is a vertically disposed lever arm guiding member 45. Fixed to the free end of lever arm 41 is a bracket 46 carrying a pivot pin 46′ which pin pivotally connects the upper end of weight rod 47 to bracket 46. The lower end of the rod 47 carries an adjusting weight supporting member 48 on which removable weights 49 are supported.

Instead of providing the contact member 40 with a plane roller engaging surface, a contact member 40′ as illustrated in Figure 3, having a curved contact surface may be provided. The curvature of surface 40′ is such that a tangent thereto at the point of contact with roller 39 will always be at right angles to the axis of member 36 leading to the diaphragm. By providing such a contact surface the direction of the resultant pressure of the lever arm will always coincide with the center line of the stem leading to the diaphragm, thus avoiding any pressure tending to push the diaphragm stem sideways and accordingly eliminating an otherwise frictional contact of the stem with stem guiding means on the diaphragm casing.

*Operation*

When diaphragm 30 is in its lowest position as indicated by the dotted line position, gas pressure is exerted on the supporting pan 33 and a resultant force is exerted on the annular portion 50 of the diaphragm which aids in moving the diaphragm and valve stem upward. When the diaphragm is in the upper position as indicated by full lines on the drawing a resultant force of the gas pressure is exerted parallel to the cross-sectional configuration of the diaphragm adjacent the margin thereof where secured to the diaphragm casing which force does not aid in moving the diaphragm but is absorbed on the diaphragm casing so that in the lower position the area of the pan together with the projected area of the annular diaphragm section outside of the pan is under pressure tending to move the valve stem upward while in its upper position only the area of the pan or supporting member 33 is under pressure tending to raise the diaphragm and valve stem. Accordingly the effective area subject to operating pressures varies as the position of the diaphragm changes. Since the effective valve operating area is greater in the lower position than in the upper position in the lower position a smaller gas pressure is required to balance the weight exerted on the diaphragm than when the diaphragm is in the upper position.

When the diaphragm is in its upper position, the weight 49 is in the position shown in full lines, and the point of contact of roller 39 with member 40 is such that the leverage of arm 41 to multiply pressure on the diaphragm is minimum. As the diaphragm moves downward, the roller 39 will move on the contact member 40 toward the pivotal connection 42 increasing the weight lever arm and pressure on the diaphragm. When the diaphragm is in its lowest position the lever arm 41 will have moved to the position shown in dotted lines and the roller 39 will have assumed the position shown in dotted lines giving a maximum leverage on the diaphragm. Accordingly the downward force exerted on the diaphragm increases as the effective diaphragm area increases, and correction may be made for the changes of effective diaphragm area.

In addition, the pressure delivered at the outlet 13 may be varied by varying the distance X of the fixed pivot 42 from the longitudinal center line of the lever arm, which may be accomplished by interchangeable fulcrum posts 43 of varying lengths. Thus the lever arm can be pivotally connected so that as the diaphragm moves upward the lever arm will be shortened more than enough to compensate for the change in the effective area of the diaphragm. Similarly as the length of a controlled conduit is changed, the parts can be proportioned to vary the length of the lever arm to take care of the varying resistance to flow to deliver a substantially constant pressure at the discharge or at a predetermined point of the controlled conduit, without changing the regulator mechanism since the adjustment is made by replacing member 43 which is exterior of the regulator.

Having thus set forth a preferred embodiment of my invention, what I claim and desire to secure by U. S. Letters Patent is:

1. In a regulator of gas pressure, a diaphragm casing, an actuating diaphragm supported in said casing, a guiding member extending outwardly from said diaphragm, a lever arm provided with a curved portion whose end is offset and pivotally secured to said casing at a point adjacent the plane of the diaphragm, a weight fixed to the opposite end of said lever arm, said lever arm being adapted to movably engage said guiding member intermediate the ends thereof, and designed to move over a considerable distance with respect to said guiding member, thereby permitting a relatively wide pressure regulating range.

2. In a regulator of gas pressure, a lever arm pivotally secured at one end thereof, a weight fixed to the opposite end of said lever arm, said lever arm intermediate the ends thereof being provided with a contact member having an arcuate contact surface, an actuating diaphragm, a guiding member extending outwardly from said diaphragm, and a roller carried by said guiding member adapted to engage said arcuate contact surface.

3. In a fluid pressure regulator, a fluid conduit, a valve and valve casing in said conduit, said casing including a housing having a flexible diaphragm supported therein, said housing being in communication with said conduit, a guide member secured to said diaphragm and projecting outwardly through said housing, said guide member being provided with at least one pair of oppositely disposed and parallel faces, a plurality of rollers each freely mounted upon said housing for antifrictional engagement with one of said parallel faces, a valve stem connected to said guide member and to said valve, and a weighted lever pivotally mounted upon said casing and provided with a contact surface in engagement with the outer end of said guide member.

4. In the device set forth in claim 3, said guide member carrying an antifriction element at its outer end, and said contact surface being so curved that a tangent thereto at any point of contact with the antifriction element is normal to the axis of the guide member.

5. In a regulator of gas pressure an actuating diaphragm, a guiding member extending outwardly from said diaphragm, an anti-friction member carried by said guiding member, a lever arm pivotally secured at one end thereof, a weight carried by the opposite end of said lever arm, a contact member carried by said lever arm intermediate the ends thereof, the surface of said contact member being so formed longitudinally that the distance of the contact member from its longitudinal center line gradually changes throughout its length.

In testimony whereof I affix my signature.

EARLE A. CLARK.